(12) United States Patent
Ko et al.

(10) Patent No.: US 11,565,514 B2
(45) Date of Patent: Jan. 31, 2023

(54) RELEASE FILM, TRAY MODULE INCLUDING THE SAME, AND METHOD OF MANUFACTURING DISPLAY DEVICE USING THE TRAY MODULE

(71) Applicant: Samsung Display Co., LTD., Yongin-si (KR)

(72) Inventors: Yonggi Ko, Asan-si (KR); Hyoung-Jin Lee, Cheonan-si (KR); Hyeji Jang, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 146 days.

(21) Appl. No.: 17/022,599

(22) Filed: Sep. 16, 2020

(65) Prior Publication Data

US 2021/0138777 A1 May 13, 2021

(30) Foreign Application Priority Data

Nov. 8, 2019 (KR) ........................ 10-2019-0142842

(51) Int. Cl.
*B32B 37/00* (2006.01)
*G06F 1/16* (2006.01)
*G02B 1/14* (2015.01)
*B32B 38/18* (2006.01)
*B32B 27/08* (2006.01)
*B65D 71/00* (2006.01)

(52) U.S. Cl.
CPC .......... *B32B 37/0046* (2013.01); *B32B 27/08* (2013.01); *B32B 38/1808* (2013.01); *B32B 38/1858* (2013.01); *G02B 1/14* (2015.01); *G06F 1/1609* (2013.01); *B32B 2457/208* (2013.01); *B65D 71/00* (2013.01)

(58) Field of Classification Search
CPC . B32B 27/08; B32B 37/0046; B32B 38/1808; B32B 38/1858; B32B 2457/208; B65D 71/00; G02B 1/14; G06F 11/609; G06F 1/1609
USPC .................................................. 206/557–565
See application file for complete search history.

(56) References Cited

U.S. PATENT DOCUMENTS

| 9,644,078 | B2 * | 5/2017 | Lee ............................ C08J 7/18 |
| 10,114,422 | B2 | 10/2018 | Lee et al. |
| 2011/0089076 | A1 * | 4/2011 | Niven .................. B65D 77/046 206/559 |
| 2018/0366679 | A1 | 12/2018 | Kim et al. |
| 2021/0129480 | A1 * | 5/2021 | Le .............................. B32B 7/06 |

FOREIGN PATENT DOCUMENTS

| KR | 100921799 B1 | 10/2009 |
| KR | 1020170064161 A | 6/2017 |
| KR | 1020180029172 A | 3/2018 |
| KR | 1020180138249 A | 12/2018 |

* cited by examiner

*Primary Examiner* — Bryon P Gehman
(74) *Attorney, Agent, or Firm* — Cantor Colburn LLP

(57) ABSTRACT

A release film of a protective module for manufacturing a display device, includes a film layer including a first surface facing a protective panel which is attachable to a display panel of the display device, and a second surface opposite to the first surface; an embossed pattern layer protruding from the second surface of the film layer; and the embossed pattern layer including a plurality of intaglio portions arranged along the film layer.

20 Claims, 15 Drawing Sheets

RELEASE FILM, TRAY MODULE INCLUDING THE SAME, AND METHOD OF MANUFACTURING DISPLAY DEVICE USING THE TRAY MODULE

This application claims priority to Korean Patent Application No. 10-2019-0142842, filed on Nov. 8, 2019, and all the benefits accruing therefrom under 35 U.S.C. § 119, the contents of which are hereby incorporated by reference in its entirety.

BACKGROUND

1. Field

The present disclosure relates to a release film, a tray module including the same, and a method of manufacturing a display device using the tray module. More particularly, the present disclosure relates to a release film capable of improving productivity in manufacture of a display device, a tray module having the release film, and a method of manufacturing the display device using the tray module.

2. Description of the Related Art

A display device includes a display panel, a protective member and an optical member. The display device further includes a touch screen depending on an application of the display device. A transmissive or semi-transmissive display device further includes a backlight unit. The members of the display device are integrally formed with each other, such as through a lamination process and/or an assembling process.

The display panel, the protective member, the optical member, the touch screen and the backlight unit are provided from different locations, such as from different manufacturing lines and then assembled with each other in an assembly line, to form the display device. One or more components of the display device such as the display panel, the protective member, the optical member, the touch screen and the backlight unit are provided from outside the assembly line, such as by an outside manufacturer or external provider (e.g., supplier).

SUMMARY

The present disclosure provides a release film enabling a large amount of protective modules to be loaded in and unloaded from a same tray module, and a tray module including the protective modules.

The present disclosure provides the tray module in which a large amount of protective modules is unloaded, to improve a productivity of a display device using a component of the protective modules.

The present disclosure provides the protective module having improved visibility of inner layers from outside the protective module.

Exemplary embodiments provide a release film of a protective module for manufacturing a display device, including: a film layer including a first surface facing a protective panel which is attachable to a display panel of the display device, and a second surface opposite to the first surface; an embossed pattern layer protruding from the second surface of the film layer; and the embossed pattern layer including a plurality of intaglio portions arranged along the film layer.

The film layer may include a synthetic resin.

The embossed pattern layer may be disposed between the protective panel of a first protective module and a second protective module.

The embossed pattern layer may include an ultraviolet-curable synthetic resin.

The film layer may have a thickness from about 50 micrometers to about 75 micrometers.

The embossed pattern layer may have a thickness from about 5 micrometers to about 10 micrometers.

The embossed pattern layer may include an embossed pattern which defines the intaglio portions.

A ratio of a width of the embossed pattern to a width of the intaglio portions may be about 1:5 to about 1:6.

The width of the embossed pattern may be within a range from about 27 micrometers to about 28 micrometers, and the width of each of the intaglio portions may be within a range from about 160 micrometers to about 170 micrometers.

Each of the intaglio portions may have a quadrangular shape, a circular shape, a lozenge (or diamond) shape, or a straight-line shape.

The intaglio portions may include recesses which are each extended along a thickness direction of the embossed pattern layer and open in a direction away from the second surface of the film layer.

The embossed pattern may define a distal end which furthest from the film layer, and the distal end of the embossed pattern may have a convex shape outwardly protruded in a direction away from the second surface of the film layer.

Exemplary embodiments provide a tray module including a plurality of protective modules each including a first release film, a second release film facing the first release film, and a protective panel which is attachable to a display panel of a display device and between the first release film and the second release film, and a tray in which the protective modules are accommodated and from which the protective modules are transferred. At least one release film among the first release film and the second release film includes a film layer including a first surface facing the protective panel and a second surface opposite to the first surface, and an embossed pattern layer extended from the second surface and defining a plurality of intaglio portions arranged along the film layer.

The protective modules may include a first protective module and a second protective module, and the first protective module is closer to an opening through which the protective modules are transferred from the tray than the second protective module.

The first protective module and the second protective module which face each other within the tray, may dispose the second release film of the first protective module contacting the first release film of the second protective module.

The protective modules may further include at least an embossment adhesive member, a support member and a heat discharge member.

The tray module may further include an adhesive member disposed between the first surface and the protective panel.

The protective modules may include a first protective module and a second protective module, and the embossed pattern of the first protective module may contact the second protective module.

One release film among the first release film and the second release film may include the film layer, the embossed pattern layer and the intaglio portions, and the other release film among the first release film and the second release film may include only the film layer.

Exemplary embodiments provide a method of manufacturing a display device including providing a display panel, providing a protective panel which is attachable to the display panel, and attaching the protective panel to the display panel to provide the display device. The providing of the protective panel includes providing a tray module including a tray and a plurality of protective modules accommodated in the tray, each of the protective modules including release film removably attached to the protective panel, separating one protective module from among the protective modules, and removing the release film from the one protective module. The release film includes a film layer including a first surface facing the protective panel and a second surface opposite to the first surface, and an embossed pattern layer protruding from the second surface and defining a plurality of intaglio portions arranged along the film layer.

According to one or more exemplary embodiment, the release film includes the embossed pattern layer, and the tray module accommodates a large amount of protective modules including the release film with the embossed pattern layer. Therefore, productivity in manufacturing of the display device may be improved.

According to one or more exemplary embodiment, the present disclosure may improve the visibility of the release film attached to the protective module, from outside the protective module. Thus, whether the protective panel within the protective module is defective or not, may be effectively checked during the manufacturing process.

BRIEF DESCRIPTION OF THE DRAWINGS

The above and other advantages of the present disclosure will become readily apparent by reference to the following detailed description when considered in conjunction with the accompanying drawings where.

DETAILED DESCRIPTION

Figure 1:
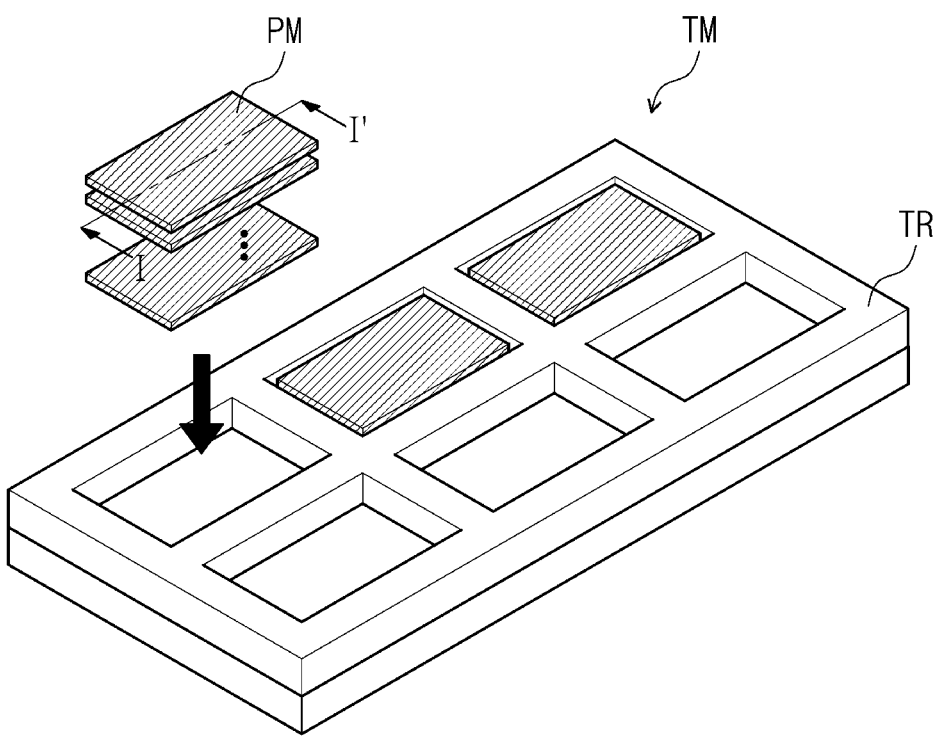
FIG. 1 is a perspective view showing an exemplary embodiment of a tray module.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the present disclosure, it will be understood that when an element or layer is referred to as being related to another element such as being "on," "connected to" or "coupled to" another element or layer, it can be directly on, connected or coupled to the other element or layer or intervening elements or layers may be present. In contrast, when an element or layer is referred to as being related to another element such as being "directly on," "directly connected to" or "directly coupled to" another element or layer, no intervening elements or layers are present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting. As used herein, the singular forms, "a", "an" and "the" are intended to include the plural forms as well, unless the context clearly indicates otherwise. "At least one" is not to be construed as limiting "a" or "an." "Or" means "and/or." As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures.

It will be further understood that the terms "comprises," "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

When components of a display device DD are provided to an assembly line, from a manufacturing line separate from the assembly line or provided from a source outside the assembly line (e.g., outside manufacturer, external provider, supplier, etc.) a tray TR is used to safely transfer the components of the display device DD.

Hereinafter, the present disclosure will be explained in detail with reference to the accompanying drawings.

FIG. 1 is a perspective view showing an exemplary embodiment of a tray module TM.

Referring to FIG. 1, the tray module TM includes a tray TR (e.g., tray portion) and a protective module PM (e.g., protective portion). The tray module TM and components thereof may be disposed in a plane defined by a first direction and a second direction which cross each other. A thickness of the tray module TM and components thereof may be defined in a third direction which crosses each of the first direction and the second direction. In FIG. 1, for example, the vertical direction may indicate a thickness direction.

The tray TR accommodates a protective module PM provided in plurality (e.g., a plurality of protective modules PM) as indicated by the downward arrow in FIG. 1. The protective module PM includes a protective panel CP disposed under a display panel DP (FIG. 6F) within a display device DD (FIG. 6F), to support the display panel DP. The protective module PM includes a release film to reduced or effectively prevent damage or defect in the protective panel CP, during a manufacturing process. In an embodiment of a method of manufacturing a display device DD, the tray TR corresponds to a transfer unit 10 that transfers members like the protective module PM, within the manufacturing process of the display device DD.

According to an exemplary embodiment, the tray TR includes a plurality of accommodating portions that respectively accommodate the protective modules PM. In more detail, the tray TR accommodates the protective modules PM using the accommodating portions. In FIG. 1, the tray TR includes six accommodating portions. In an embodiment, for example, each of the six accommodating portions accommodates twenty protective modules PM. In total, the tray TR having six accommodating portions accommodates one hundred twenty protective modules PM.

Portions of the tray TR may define the accommodating portions. The accommodating portions may define a recess or an opening in the tray TR, where the recess or opening is open toward an upper side of the tray module TM. Referring to FIG. 1, the accommodating portion may be defined by a bottom portion of the tray TR and inner sidewalls of the tray TR which are extended from the bottom portion. More than one of the protective module PM may be accommodated in a same one of the accommodating portion. In detail, the tray TR includes a recess of the accommodating portion in which each of the protective modules PM are accommodated, the recess defining an opening of the accommodating portion through which the protective modules PM are transferred from the tray module TM.

According to an exemplary embodiment, the tray TR is provided in a plural number (e.g. plurality of trays TR) within the tray module TM. The plural trays TR are provided to be stacked vertically, e.g., a thickness direction of the trays TR. FIG. 1 shows two trays TR, however, this is merely exemplary. Three or more trays TR can be provided in the manufacturing process of the display device DD, and thus, the plural protective modules PM within such tray TR are transferred together at one time. This will be described in detail with reference to FIGS. 6A to 6F.

According to an exemplary embodiment, the tray module TM includes a plurality of trays TR that respectively includes a plurality of protective modules PM.

Figure 2A:
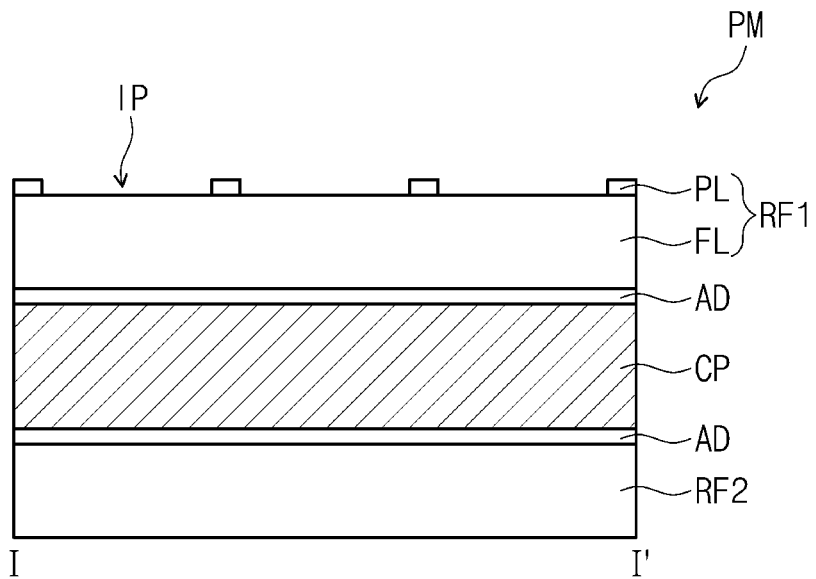
FIGS. 2A to 2C are cross-sectional views respectively showing an exemplary embodiment of a protective module.
Figure 2B:
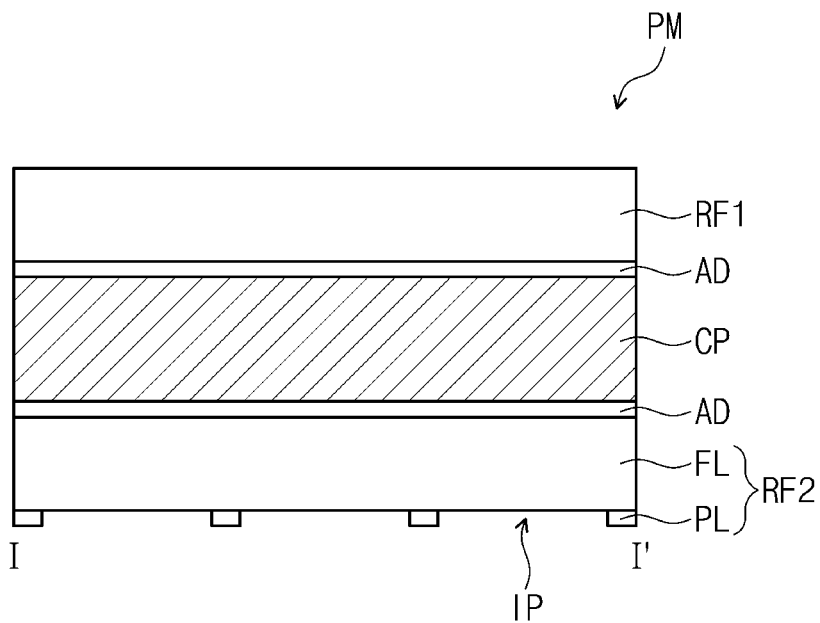
Figure 2C:
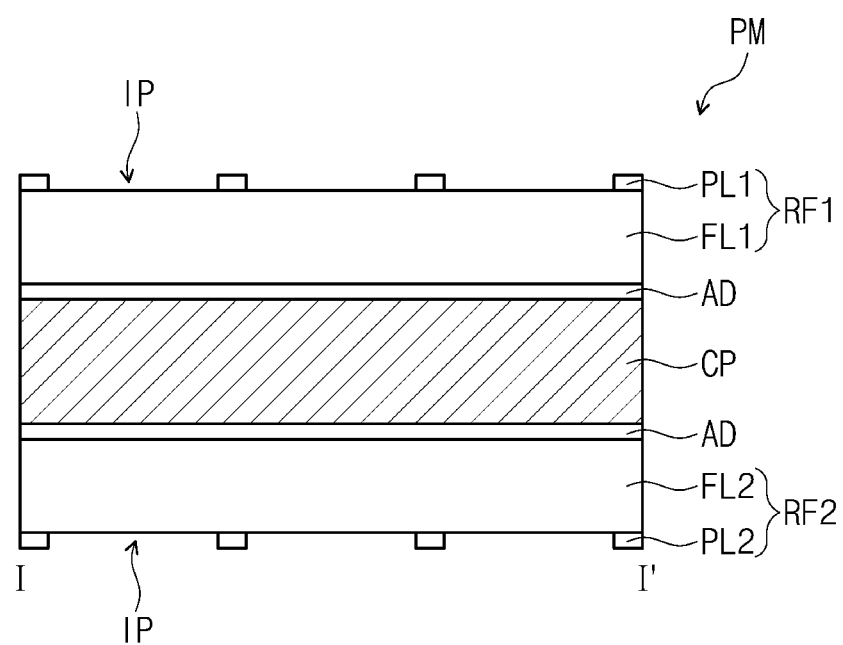

FIGS. 2A to 2C are cross-sectional views respectively showing an exemplary embodiment of a protective module PM. FIGS. 2A to 2C are cross-sectional views taken along line I-I' of FIG. 1.

FIG. 2A is a cross-sectional view showing a protective module PM including a first release film RF1 in which an embossed pattern layer PL is included. FIG. 2B is a cross-sectional view showing a protective module PM including a second release film RF2 in which an embossed pattern layer PL is included. FIG. 2C is a cross-sectional view showing a protective module PM including a first release film RF1 and a second release film RF2 including a first embossed pattern layer PL1 and a second embossed pattern layer PL2, respectively.

Referring to FIG. 2A, the protective module PM includes the first release film RF1, a protective panel CP, and a second release film RF2. The protective module PM includes the first release film RF1, the second release film RF2 disposed under the first release film RF1, and the protective panel CP disposed between the first release film RF1 and the second release film RF2. That is, the first release film RF1 faces the second release film RF2 with the protective panel CP therebetween. In the exemplary embodiment of the present disclosure, the protective module PM includes an adhesive member AD provided in plurality (e.g., plurality of adhesive members AD) respectively disposed between the first release film RF1 and the protective panel CP and between the protective panel CP and the second release film RF2. The release film protects an adhesive surface of the protective panel CP. The first release film RF1 and the second release film RF2 are respectively attached to the protective panel CP at an upper surface and a lower surface thereof, to prevent the protective panel CP from being damaged or defected during a manufacturing process.

In an embodiment of a method of manufacturing a display device DD, the first release film RF1 and the second release film RF2 are removed from the protective module PM before the protective panel CP is attached to the display panel DP. That is the first release film RF1 and the second release film RF2 are removably attached to the protective panel CP. In the exemplary embodiment, the first release film RF1 includes a film layer FL (e.g., base layer) and the embossed pattern layer PL. The film layer FL includes a first surface which faces the protective panel CP and a second surface which is opposite to the first surface. In an exemplary embodiment, the film layer FL includes the first surface facing a protective panel CP which is attachable to a display panel DP of the display device DD and a second surface opposite to the first surface, an embossed pattern layer PL protruding from the second surface, and the embossed pattern layer PL defining a plurality of intaglio portions IP arranged along the film layer FL. The protective panel CP may be considered as including one or more of the adhesive member AD, such that the film layer FL may be considered as including a first surface which contacts the protective panel CP at the adhesive member AD thereof.

The embossed pattern layer PL is disposed on the second surface and includes an opening such as an intaglio portion IP provided in plurality (e.g., a plurality of intaglio portions IP). The opening may be defined by removing portions of a material layer providing the embossed pattern layer PL, such as removing the portions along a thickness direction. An entirety of a thickness of the material layer may be removed to form the intaglio portions IP. The second surface of the film layer FL may be exposed outside of the embossed pattern layer PL, at the openings. The intaglio portions IP may protrude from the second surface of the film layer FL, in a direction away from the protective panel CP. The intaglio portions IP may be considered as including recesses which are each extended along a thickness direction of the embossed pattern layer PL and open in a direction away from the second surface of the film layer FL, without being limited thereto.

Referring to FIG. 2B, the protective module PM includes a first release film RF1, a protective panel CP and the second release film RF2. The second release film RF2 includes a film layer FL having a first surface facing the protective panel CP and a second surface which is opposite to the first surface and includes an embossed pattern layer PL. The embossed pattern layer PL includes a plurality of intaglio portions IP, such as defined by removing portions of a material layer providing the embossed pattern layer PL, along a thickness direction.

Referring to FIG. 2C, the protective module PM includes the first release film RF1, a protective panel CP, and the second release film RF2. The first release film RF1 includes a first film layer FL1 having a first surface facing the protective panel CP and a second surface which is opposite to the first surface and including a first embossed pattern layer PL1. The first embossed pattern layer PL1 includes a plurality of intaglio portions IP defined such as by removing portions of a material layer providing the first embossed pattern layer PL1, along a thickness direction. The second release film RF2 includes a second film layer FL2 having a first surface facing the protective panel CP and a second surface which is opposite to the first surface and including a second embossed pattern layer PL2. The second embossed pattern layer PL2 includes a plurality of intaglio portions IP defined such as by removing portions of a material layer providing the second embossed pattern layer PL2, along a thickness direction.

Figure 3A:
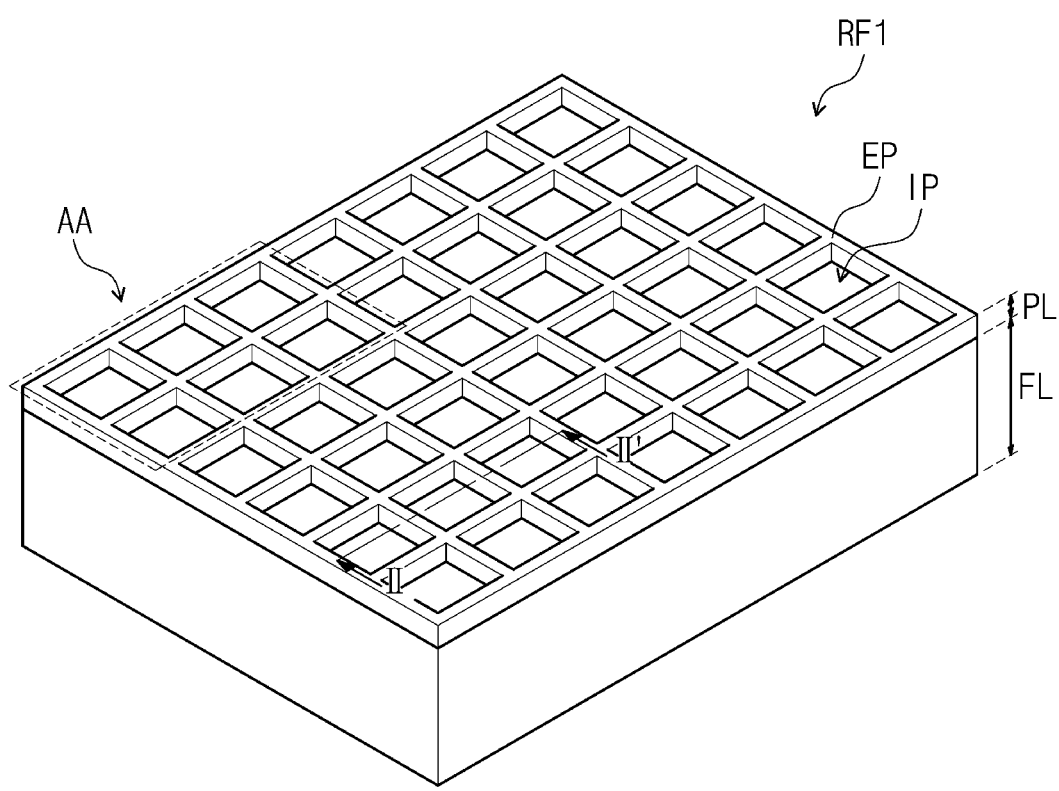
FIGS. 3A to 3C are views respectively showing an embodiment of a release film of a protective module.
Figure 3B:
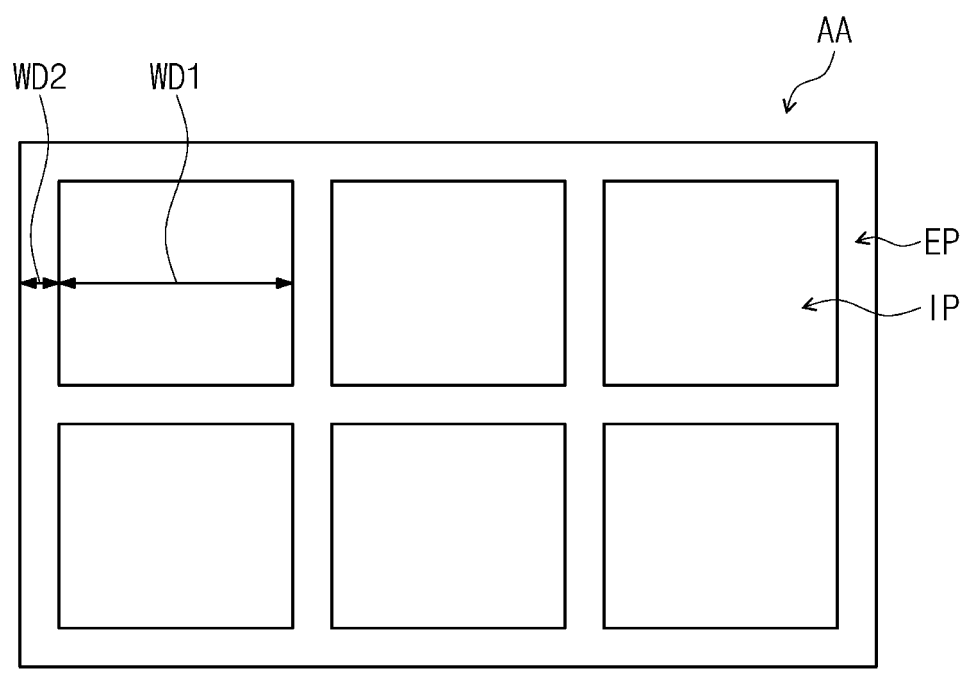
Figure 3C:
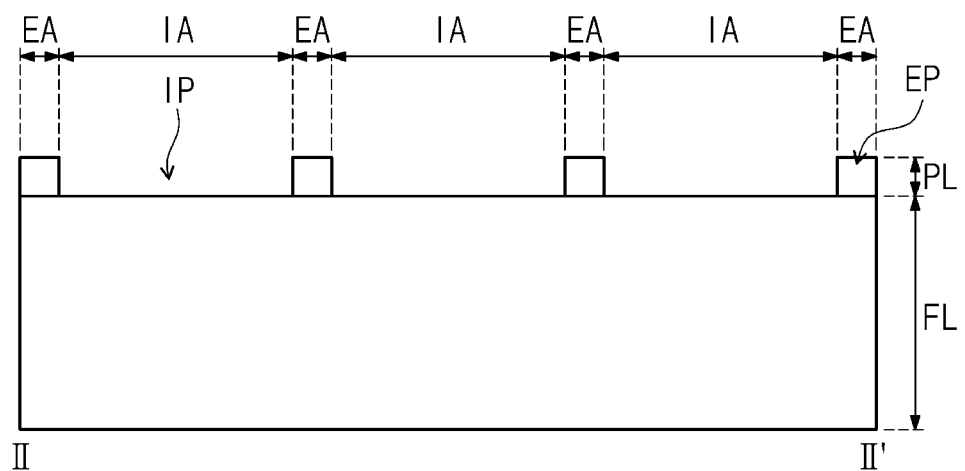

FIG. 3A is a perspective view showing a first release film RF1. FIG. 3B is a top plan view showing a region or area AA of FIG. 3A. FIG. 3C is an enlarged cross-sectional view taken along line II-II' of FIG. 3A.

Referring to FIGS. 3A and 3C, the first release film RF1 includes a film layer FL and an embossed pattern layer PL. FIG. 3A shows the first release film RF1, however, a second release film RF2 may have the same structure as the first release film RF1, and thus, descriptions of the first release film RF1 may be applied to the second release film RF2. In FIG. 3C, the first release film RF1 may include an intaglio area IA and an embossed area EA.

According to the exemplary embodiment, the film layer FL includes a first surface facing the protective panel CP and a second surface which is opposite to the first surface. The embossed pattern layer PL is disposed on the second surface and includes a plurality of intaglio portions IP defined such as by removing portions of an embossed pattern material layer, along the thickness direction. The film layer FL includes a synthetic resin polyethylene terephthalate ("PET"). The embossed pattern layer PL is disposed on the second surface as an outside surface of the film layer FL. In an exemplary embodiment, the embossed pattern layer PL includes the intaglio portions IP provided or formed by coating an ultraviolet-curable synthetic resin as an embossed pattern material layer, on the second surface of the film layer FL, and removing portions of the ultraviolet-curable synthetic resin along the thickness direction, such as through a thermocompression process.

According to an exemplary embodiment, the film layer FL has a thickness from about 50 micrometers to about 75 micrometers. In an exemplary embodiment, a thickness of the film layer FL is about 60 micrometers. The embossed pattern layer PL has a thickness from about 5 micrometers to about 10 micrometers. In the exemplary embodiment, the thickness of the embossed pattern layer PL corresponds to a thickness of an embossed pattern EP defined by providing or forming the intaglio portions IP. The embossed pattern EP may be a solid portion of the embossed pattern material layer, while the intaglio portion IP may be an opening defined by the solid portion. The embossed pattern EP is disposed at portions of the second surface to be protruded therefrom. The embossed pattern EP defines the embossed area EA, and the intaglio portion IP defines the intaglio area IA. That is, the embossed area EA may be a planar area in which the embossed pattern EP is disposed, while the intaglio area IA may be a planar area at which the intaglio portion IP is disposed.

The embossed pattern layer PL includes or is formed of a transparent material and has a relatively small thickness. Thus, an exterior of the protective panel CP (FIG. 2C) disposed below the embossed pattern layer PL may be inspected or viewed from outside the embossed pattern layer PL in a manufacturing or inspection process.

Referring to FIG. 3B, the embossed pattern layer PL includes a plurality of intaglio portions IP and an embossed pattern EP of which portions thereof define the intaglio portions IP. In FIG. 3B, for example, the vertical direction and the horizontal direction may variously represent the first direction and the second direction. The intaglio portion IP may include a first width WD1 taken along the first direction and/or the second direction. In a same direction in which the first width WD1 is taken the embossed pattern EP may include a second width WD2. Referring to FIG. 3B, a portion of the embossed pattern EP which includes or defines a sidewall of the embossed pattern layer PL at the intaglio portion IP, has the second width WD2. The second width WD2 may be a dimension of a portion of the embossed pattern EP which is between two of the intaglio portions IP which are adjacent to each other. A contact area of the protective module PM relative to another element facing the protective module PM, may be a total planar area of the solid portion (e.g., the embossed pattern EP) of the embossed pattern layer PL. A size of the contact area defined by the protective module PM may be less than a total planar area of the element facing the protective module PM.

According to an exemplary embodiment, a ratio of the second width WD2 of the embossed pattern EP to the first width WD1 of the intaglio portions IP, is about 1:5 to about 1:6. In an exemplary embodiment, for example, the intaglio portions IP include two of the intaglio portions IP spaced apart from each other along a first direction, by a portion of the embossed pattern EP, and an intaglio portion IP among the two of the intaglio portions IP has a first width WD1 along the first direction. The portion of the embossed pattern EP has a second width WD2 along the first direction, and a ratio of the second width WD2 of the portion of the embossed pattern EP to the first width WD1 of the intaglio portion IP is about 1:5 to about 1:6.

In an exemplary embodiment, for example, the second width WD2 of the embossed pattern EP is within a range from about 27 micrometers to about 28 micrometers, and the first width WD1 of each of the intaglio portions IP is within a range from about 160 micrometers to about 170 micrometers. Since the second width WD2 of the embossed pattern EP is smaller than the first width WD1, a contact area between the protective modules PM which are adjacent to each other, may be reduced. The intaglio portions IP of a protective module PM form an air gap AG (FIG. 6B) with a member adjacent thereto, and thus a formation of low vacuum (differential pressure) between the protective modules PM may be reduced or effectively prevented.

Figure 4A:
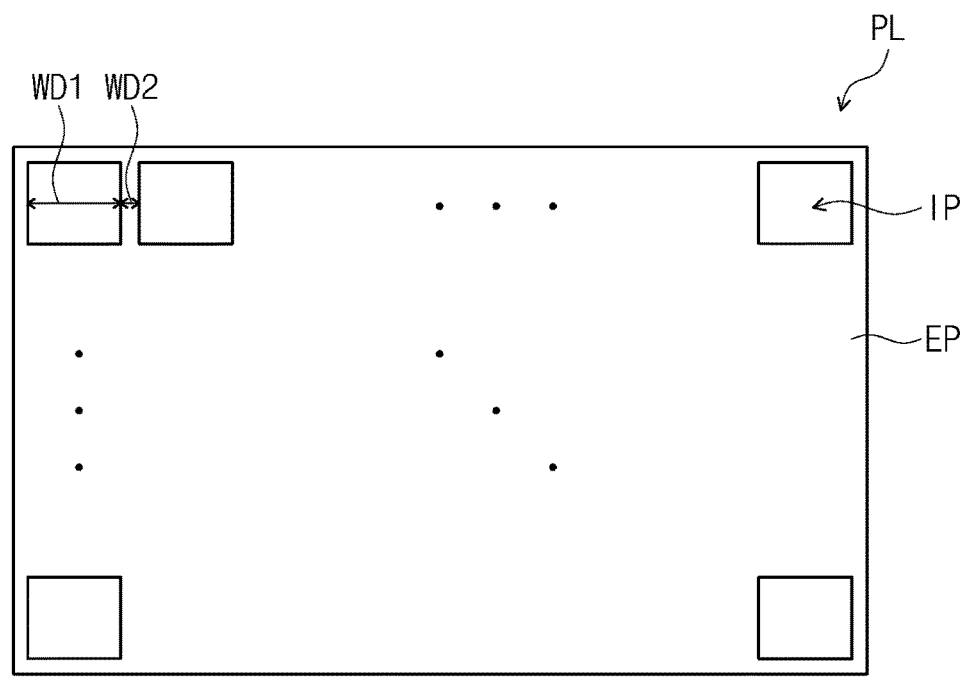
FIGS. 4A to 4E are top plan views respectively showing an embodiment of a release film.
Figure 4B:
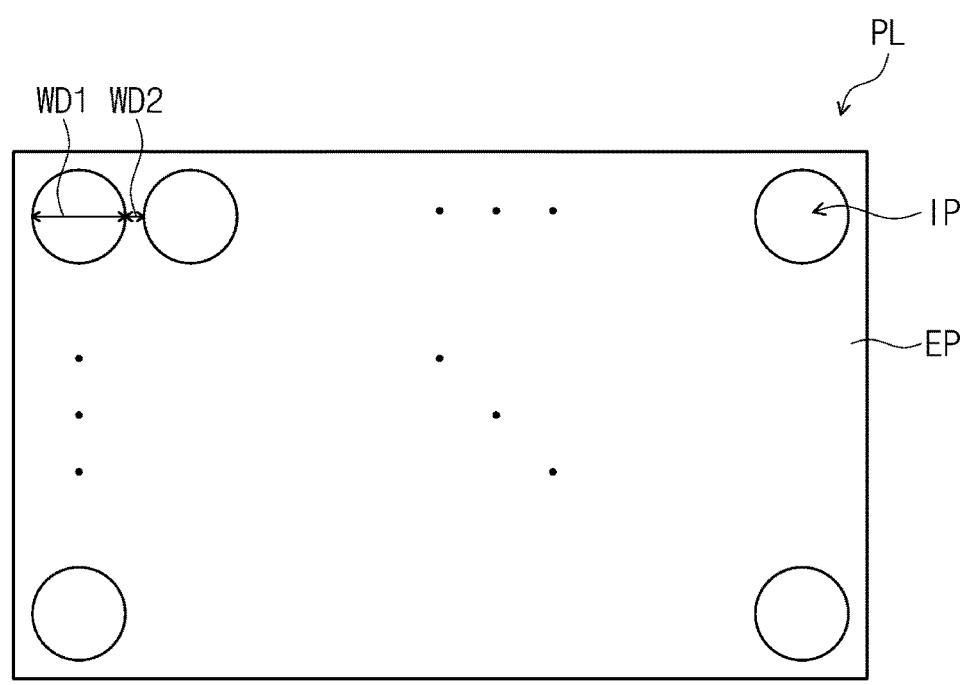
Figure 4C:
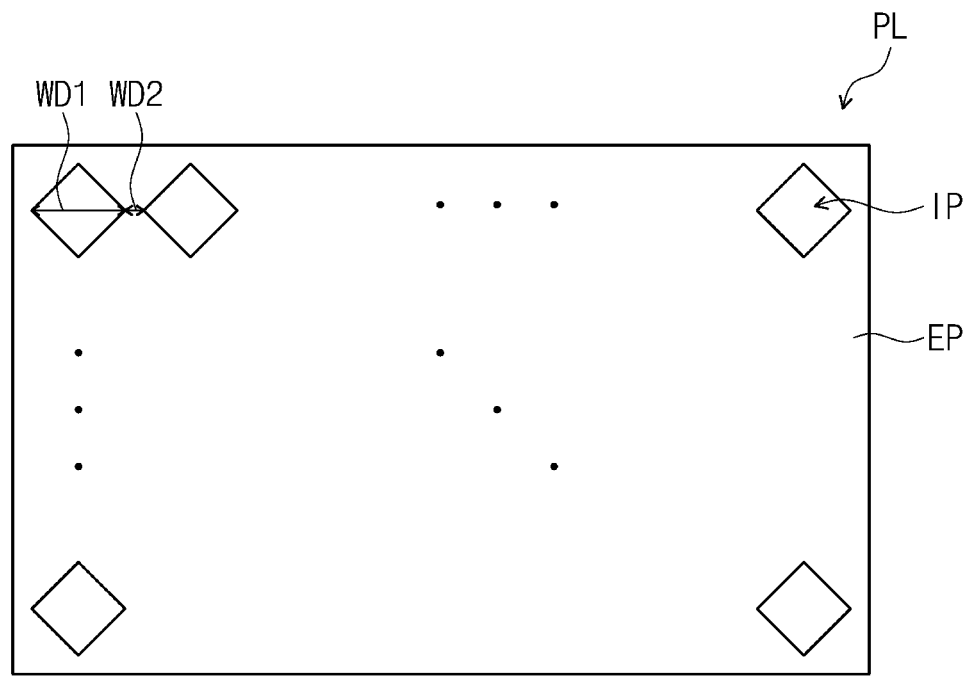
Figure 4D:
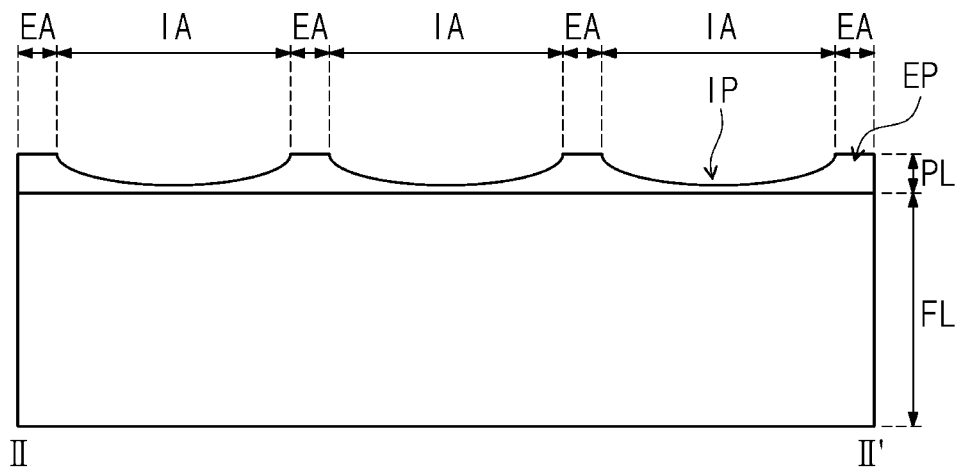
Figure 4E:
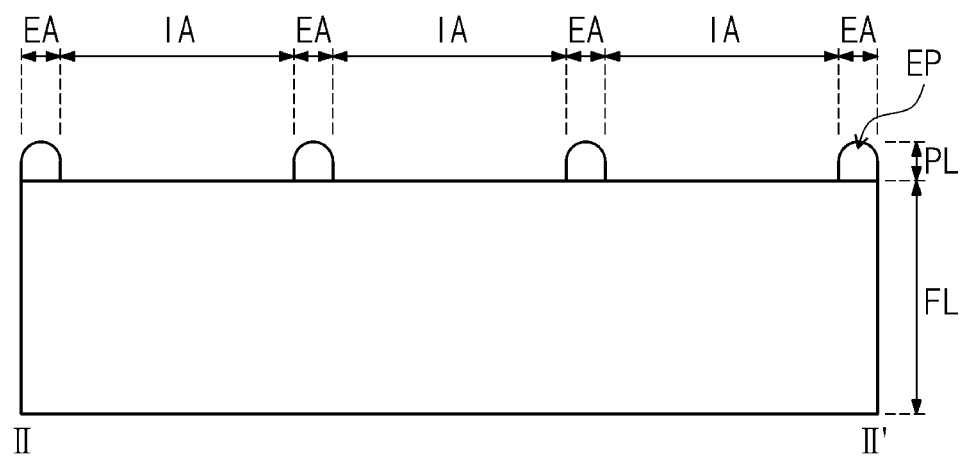

FIGS. 4A to 4C are top plan views respectively showing an embodiment of a release film. FIGS. 4D and 4E are enlarged cross-sectional views taken along line II-II' of FIG. 3A.

Referring to FIGS. 4A to 4C, a plurality of intaglio portions IP may have a planar shape such as a quadrangular shape (FIG. 4A), a circular shape (FIG. 4B), or a lozenge or diamond shape (FIG. 4C). An embossed pattern layer PL includes the intaglio portions IP having various planar shapes while maintaining a ratio of the second width WD2 of the embossed pattern EP to the first width WD1 of the intaglio portions IP.

Referring to FIG. 4D, a plurality of intaglio portions IP is provided or formed by removing portions of an embossed pattern material layer, along a thickness direction, to define an embossed pattern layer PL. A portion of the embossed pattern material layer may remain at the intaglio portions IP. A thickness of the embossed pattern material layer which remains at the intaglio portions IP may be within a range from about 5 micrometers to about 10 micrometers. Referring to FIG. 4D, embossed pattern layer PL may be concavely provided or formed at the intaglio portions IP, to have a curved shape along the thickness direction.

Referring to FIG. 4E, the intaglio portions IP may penetrate through an entirety of the thickness of the embossed pattern material layer, similar to FIG. 3C. However, an upper surface of an embossed pattern EP has a convex shape in a direction away from the film layer FL, but should not be limited thereto or thereby and may have a variety of shapes.

Figure 5A:
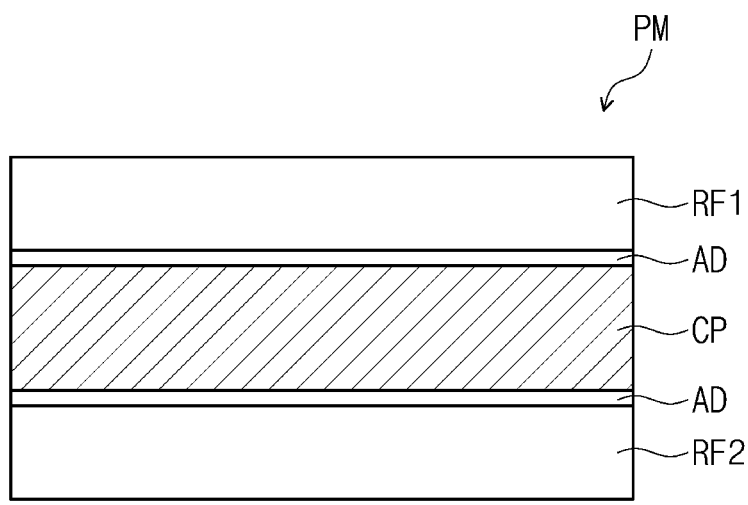
FIGS. 5A and 5B are cross-sectional views respectively showing an embodiment of a protective module.
Figure 5B:
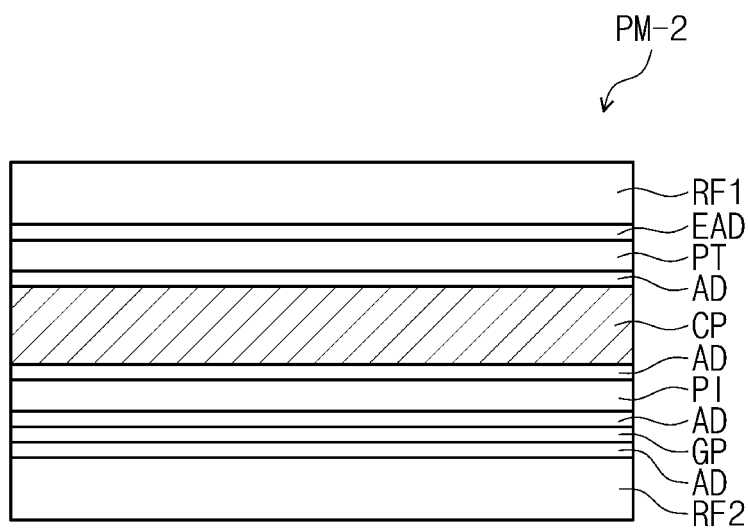

FIGS. 5A and 5B are cross-sectional views respectively showing an embodiment of a protective module PM and a protective module PM-2.

FIG. 5A is a cross-sectional view showing the protective module PM including a protective panel CP which is applied to a display device DD having a foldable structure. FIG. 5B is a cross-sectional view showing the protective module PM-2 including a protective panel CP which is applied to a display device DD having a rigid or flexible structure. In FIGS. 5A and 5B, individual members of a film layer FL and an embossed pattern layer PL are omitted and are collectively indicated in a first release film RF1 and a second release film RF2.

Referring to FIG. 5A, the protective module PM includes a first release film RF1, a second release film RF2 and the protective panel CP. The protective module PM shown in FIG. 5A has the structure applied to the display device DD having the foldable structure and includes the first release film RF1, the second release film RF2 disposed under the first release film RF1, and the protective panel CP disposed between the first release film RF1 and second release film RF2. Due to structural characteristics, such as folding and unfolding characteristics, of the display device DD having the foldable structure, the protective module PM includes only the protective panel CP between the first release film RF1 and the second release film RF2, such as where the protective panel CP is considered as including the adhesive member AD. According to the exemplary embodiment, the protective module PM may further include adhesive members AD respectively disposed between the first release film RF1 and the protective panel CP and between the protective panel CP and the second release film RF2. In this case, the protective panel CP corresponds to a cushion layer formed of a polyurethane material. The protective module PM applied to the display device DD having the foldable structure has a relatively larger size due to the expansion of a display area than the protective module PM of FIG. 2B. Accordingly, the present disclosure discloses the protective module PM having a shape and a property to be effectively loaded in the tray module TM.

Referring to FIG. 5B, the protective module PM-2 includes a first release film RF1, an embossment adhesive member EAD (e.g., embossment adhesive layer), a protective panel CP, a protective member PT (e.g., protective layer), a support member PI (e.g., support layer), a heat discharge member GP, (e.g., heat discharging layer) and a second release film RF2. The protective module PM-2 shown in FIG. 5B is applied to the display device DD having the rigid or flexible structure and has a multi-layer structure of multiple members having a variety of functions, such as optical shielding, impact resistance improvement, and heat discharging, in addition to the protective panel CP.

FIGS. 6A to 6F are views showing processes in an exemplary embodiment of a method of manufacturing a display device DD.

Figure 6A:
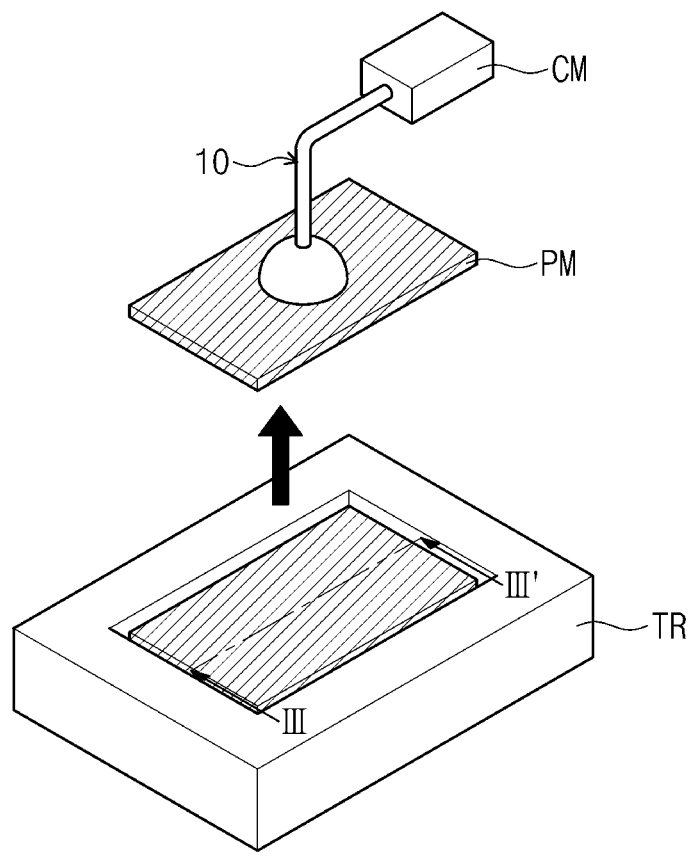
FIGS. 6A to 6F are views showing processes in an exemplary embodiment of a method of manufacturing a display device.
Figure 6B:
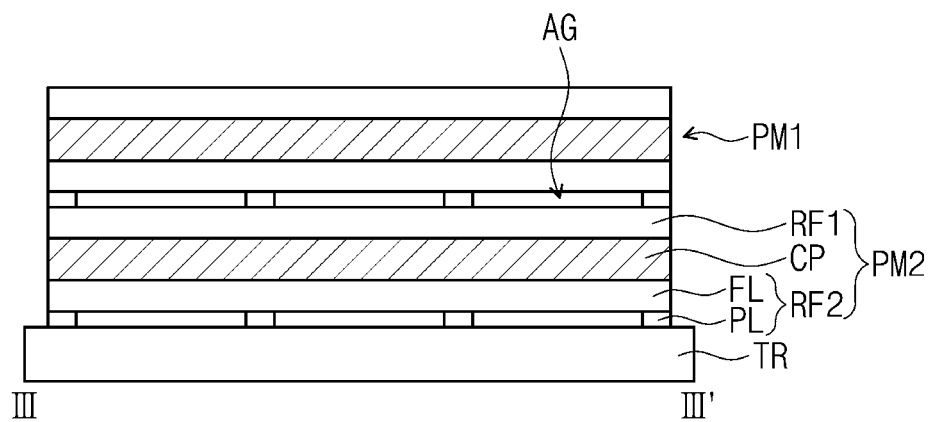
Figure 6C:
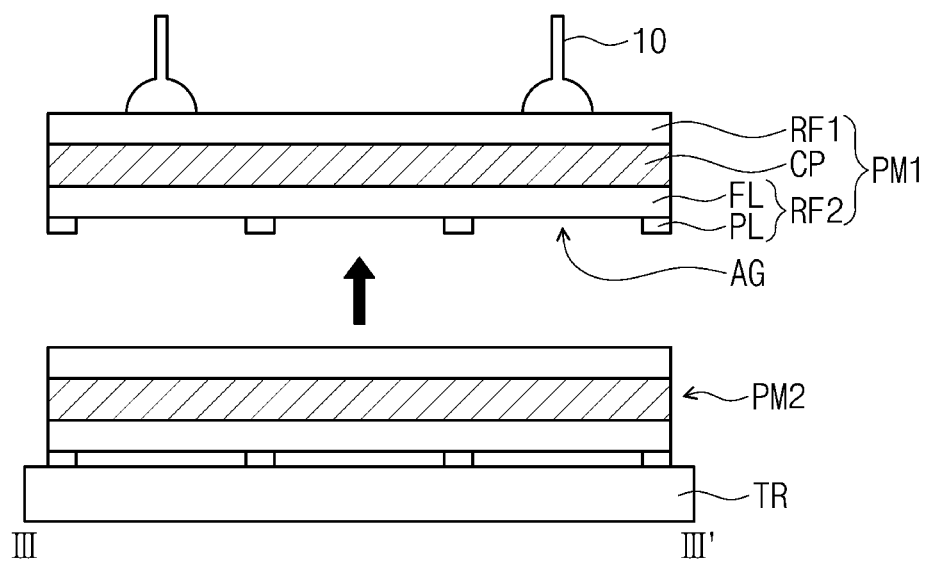
Figure 6D:
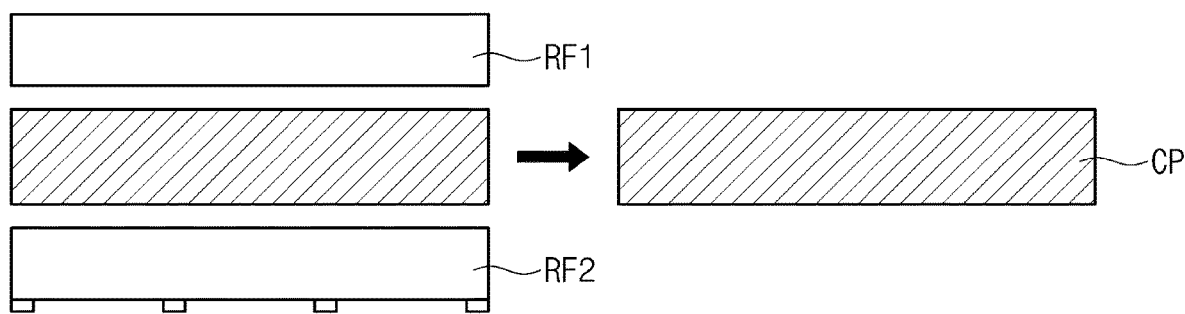
Figure 6E:
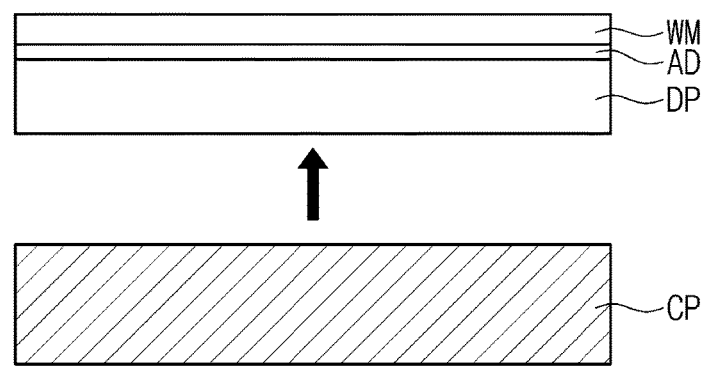
Figure 6F:
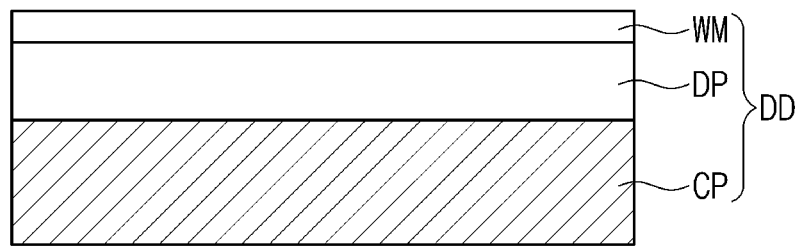

FIG. 6A is a perspective view showing a protective module PM in an embodiment of an operation of a manufacturing method of the display device DD. FIGS. 6B and 6C are cross-sectional views taken along line III-III' of FIG. 6A. FIGS. 6D and 6E are cross-sectional views showing a protective module PM in an embodiment of operations of the manufacturing method of the display device DD. FIG. 6F is a cross-sectional view schematically showing an embodiment of the display device DD manufactured by the method.

In FIG. 6A, a transfer unit 10 transfers the protective module PM from the tray module TM in the manufacturing process of the display device DD. In an exemplary embodiment, the transfer unit 10 transfers the protective module PM from the tray TR to a next process or a next processing apparatus, to attach the protective module PM which has been transferred from the tray TR, to a display panel DP of the display device DD, under a control of a control module CM (e.g., controller). The protective module PM is separated from the tray TR before being transferred from the tray TR to the next process or the next processing apparatus. That is, the protective module PM is separable and transferrable from the tray TR, by the transfer unit 10. According to the exemplary embodiment, the protective module PM is provided in a plural number on the tray TR. The transfer unit 10 separates one of the protective module PM among the protective modules PM accommodated in the tray TR.

In FIGS. 6B and 6C, the protective modules PM accommodated in the tray TR include a first protective module PM1 and a second protective module PM2, and the first protective module PM1 is disposed on the second protective module PM2 along a thickness direction of the tray TR. FIGS. 6B and 6C show the exemplary embodiment in which the second release film RF2 includes the film layer FL and the embossed pattern layer PL. However, the exemplary embodiment shown in FIGS. 6B and 6C should not be limited thereto or thereby. That is, according to another exemplary embodiment, the first release film RF1 may include the film layer FL and the embossed pattern layer PL.

The protective modules PM which are accommodated in the tray TR dispose the second release film RF2 of the first protective module PM1 in contact with the first release film RF1 of the second protective module PM2 (FIG. 6B). The second release film RF2 of the first protective module PM1 includes the film layer FL and the embossed pattern layer PL, and the first release film RF1 of the second protective module PM2 includes only the film layer FL. That is, the embossed pattern layer PL of the first protective module PM1 is disposed between remaining layers of the first protective module PM1, and the second protective module PM2. As discussed above, the accommodating portion of the tray TR includes a recess in which each of the protective modules PM are accommodated (e.g., bottom portion of the tray TR which is labelled with "TR" in FIG. 6B), the recess defining an opening of the accommodating portion through which the protective modules PM are transferred from the tray module TM. The protective modules PM which are accommodated in the tray TR in FIG. 6B include the first protective module PM1 and a second protective module PM2 facing each other, where the first protective module PM1 is closer to the opening of the accommodating portion the than the second protective module PM2 and is therefore transferred from the tray module TM before the second protective module PM2.

The intaglio portions IP within the first protective module PM1 form the air gap AG between the embossed patterns EP of the embossed pattern layer PL, while the embossed patterns EP of the first protective module PM1 contact with the first release film RF1 of the second protective module PM2 to define a planar area at which the first protective module PM1 and the second protective module PM2 contact each other (e.g., a contact area). The contact area between the first protective module PM1 and the second protective module PM2 is reduced since only distal ends of the embossed patterns EP of the first protective module PM1, which are furthest from the second surface of the film layer FL, contact with the first release film RF1 of the second protective module PM2.

Since the air gap AG is provided or formed between the first protective module PM1 and the second protective module PM2 and the contact area therebetween is reduced, the first protective module PM1 can be effectively separated from the second protective module PM2 in transferring the first protective module PM1 from the tray TR (FIG. 6C). That is, the low vacuum (differential pressure) is provided or formed between the first protective module PM1 and the second protective module PM2, and thus, a phenomenon in which the first protective module PM1 and the second protective module PM2 are substantially simultaneously lifted may be reduced or effectively prevented in transferring the first protective module PM1 and subsequent protective modules PM from the tray TR. According to the exemplary embodiment of the present disclosure, separation of the protective modules PM one by one from the tray TR is possible. Accordingly, the number of the protective module PM accommodated in the tray module TM can be increased, and thus, the productivity of the process of providing or manufacturing the display device DD is improved.

In FIG. 6D, the protective panel CP is separated from remaining layers of the protective module PM which is separated from the tray TR. The protective panel CP is separated from the protective module PM before the protective panel CP is attached to a lower portion of the display panel DP of the display device DD in a process of manufacturing the display device DD. In the protective module PM which is separated from the tray TR, the first release film RF1 and the second release film RF2 respectively attached to upper and lower portions of the protective panel CP, are removed from the protective panel CP. That is each of the first release film RF1 and the second release film RF2 are removably attached to the protective panel CP, at upper and lower surfaces thereof, respectively.

In FIG. 6E, the protective panel CP from which the first release film RF1 and the second release film RF2 are removed, is attached to a lower portion (e.g., a lower surface) of the display panel DP which is coupled to a lower portion (e.g., a lower surface) of a window WM of a display device DD. That is, the protective panel CP is attachable to the display panel DP. Although schematically shown in FIG. 6E, in practice, various functional layers are provided under the display panel DP (e.g., at the lower surface which faces the protective panel CP). That is, the exemplary embodiment of the present disclosure should not be limited to the structure in which the protective panel CP is attached directly to the lower portion of the display panel DP as shown in FIG. 6E.

FIG. 6F schematically shows the display device DD including the protective panel CP attached to the lower portion of the display panel DP. Various functional layers may be substantially disposed between the display panel DP and the protective panel CP.

Figure 7:
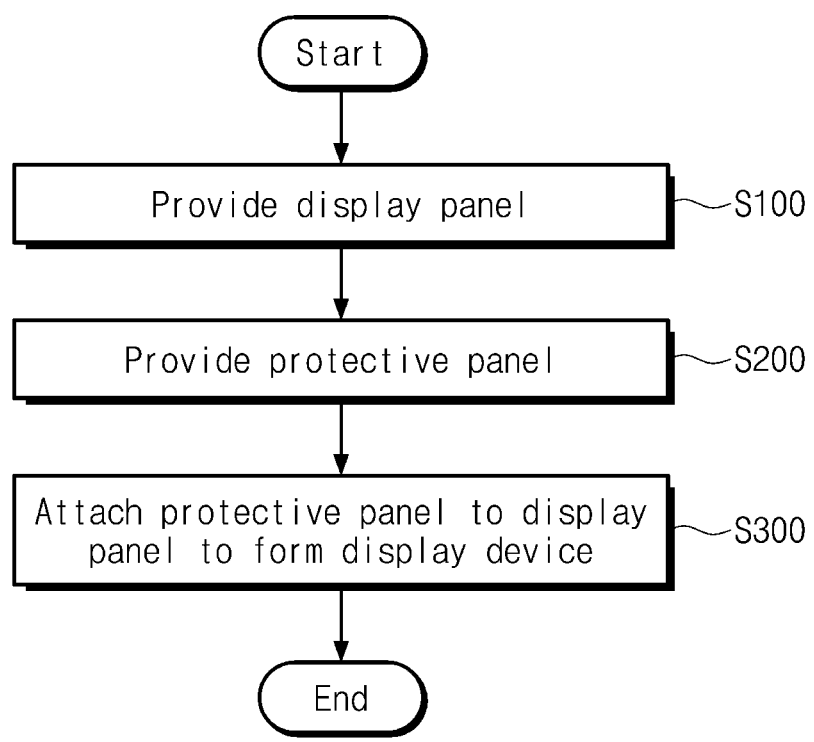
FIG. 7 is a flowchart showing an exemplary embodiment of a method of manufacturing a display device.

FIG. 7 is a flowchart showing an exemplary embodiment of the manufacturing method of the display device DD.

Referring to FIG. 7, the manufacturing method of the display device DD includes providing the display panel DP (S100), providing the protective panel CP (S200), and attaching the protective panel CP to the display panel DP to form the display device DD (S300). FIG. 7 schematically shows the manufacturing method of the display device DD according to the exemplary embodiment of the present disclosure.

Figure 8:
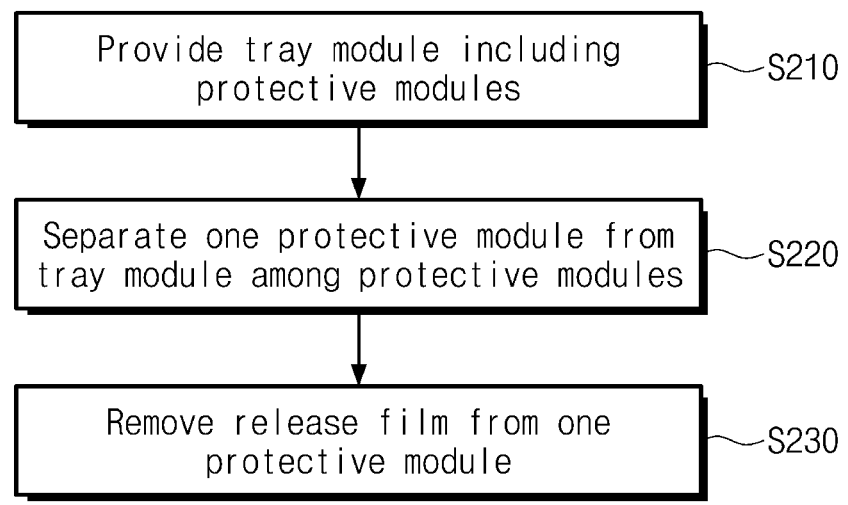
FIG. 8 is a flowchart showing an exemplary embodiment of providing a protective panel in the method of FIG. 7.

FIG. 8 is a flowchart showing an exemplary embodiment of the providing of the protective panel CP of FIG. 7.

Referring to FIG. 8, the providing of the protective panel CP (S200) includes providing the tray module TM including the plural protective modules PM (S210), separating one of the protective module PM among the plural protective modules PM from the tray module TM (S220), and removing the release film including both the first release film RF1 and the second release film RF2 from the one of the protective module PM (S230). The providing of the protective panel CP (S200) further includes removing the release film including both the first release film RF1 and the second release film RF2 from the protective module PM which is separated from the tray TR, to form the protective panel CP which is attachable to the display panel DP.

Although exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed. Therefore, the disclosed subject matter should not be limited to any single embodiment described herein, and the scope of the invention shall be determined according to the attached claims.

What is claimed is:

1. A release film of a protective module for manufacturing a display device, the release film comprising:
   a film layer of a first protective module including a first protective panel attachable to a first display panel, the film layer comprising:

a first surface at which the film layer is removably attachable to the protective panel of the first protective module, and a second surface opposite to the first surface and facing a second protective module including a second protective panel attachable to a second display panel;

an embossed pattern layer protruding from the second surface of the film layer and toward the second protective module; and the embossed pattern layer comprising a plurality of intaglio portions arranged along the film layer of the first protective module.

2. The release film of claim 1, wherein the film layer comprises a synthetic resin.

3. The release film of claim 1, wherein the embossed pattern layer comprises an ultraviolet-curable synthetic resin.

4. The release film of claim 1, wherein the film layer has a thickness from about 50 micrometers to about 75 micrometers.

5. The release film of claim 1, wherein the embossed pattern layer has a thickness from about 5 micrometers to about 10 micrometers.

6. The release film of claim 1, wherein the embossed pattern layer further comprises an embossed pattern which defines the plurality of intaglio portions arranged along the film layer.

7. The release film of claim 6, wherein
the plurality of intaglio portions comprise:
two intaglio portions spaced apart from each other along a first direction, by a portion of the embossed pattern, and
an intaglio portion among the two intaglio portions having a first width along the first direction,
the portion of the embossed pattern has a second width along the first direction, and
a ratio of the second width of the portion of the embossed pattern to the first width of the intaglio portion is about 1:5 to about 1:6.

8. The release film of claim 6, wherein
the second width of the portion of the embossed pattern is within a range from about 27 micrometers to about 28 micrometers, and
the first width of the intaglio portion is within a range from about 160 micrometers to about 170 micrometers.

9. The release film of claim 6, wherein
the embossed pattern defines a distal end which furthest from the film layer, and
the distal end of the embossed pattern has a convex shape outwardly protruded in a direction away from the second surface of the film layer.

10. The release film of claim 1, wherein each of the plurality of intaglio portions has one of a quadrangular shape, a circular shape and a diamond shape.

11. The release film of claim 1, wherein the plurality of intaglio portions comprise recesses which are each extended along a thickness direction of the embossed pattern layer and open in a direction away from the second surface of the film layer.

12. A tray module comprising:
a plurality of protective modules each comprising a first release film, a second release film facing the first release film, and a protective panel which is attachable to a display panel of a display device and between the first release film and the second release film; and a tray in which the plurality of protective modules are accommodated and from which the plurality of protective modules are transferred, wherein one release film among the first release film and the second release film comprises:
a film layer comprising a first surface facing the protective panel and a second surface opposite to the first surface;
an embossed pattern layer protruding from the second surface of the film layer, in a direction away from the protective panel; and
the embossed pattern layer defining a plurality of intaglio portions arranged along the film layer.

13. The tray module of claim 12, wherein
the tray comprises an opening through which the plurality of protective modules are transferred from the tray, and
the plurality of protective modules which are accommodated in the tray comprise a first protective module and a second protective module facing each other within the tray, the first protective module being closer to the opening than the second protective module.

14. The tray module of claim 13, wherein the first protective module and the second protective module which face each other within the tray, dispose the second release film of the first protective module contacting the first release film of the second protective module.

15. The tray module of claim 14, wherein the first protective module and the second protective module which face each other within the tray, dispose the embossed pattern layer of the first protective module between the protective panel of the first protective module and the first release film of the second protective module.

16. The tray module of claim 12, wherein the plurality of protective modules further comprise one of an embossment adhesive member between the first release film and the protective panel, a support member between the second release film and the protective panel, and a heat discharge member between the second release film and the protective panel.

17. The tray module of claim 12, wherein the first release film or the second release film which comprises the film layer, the embossed pattern layer and the plurality of intaglio portions, further comprises an adhesive member between the first surface of the film layer and the protective panel.

18. The tray module of claim 12, wherein
the plurality of protective modules which are accommodated in the tray comprise a first protective module and a second protective module facing each other within the tray, and
the first protective module and the second protective module which face each other within the tray, dispose the embossed pattern layer of the first protective module contacting the second protective module.

19. The tray module of claim 12, wherein
one release film among the first release film and the second release film comprises the film layer, the embossed pattern layer and the plurality of intaglio portions, and
the other release film among the first release film and the second release film comprises only the film layer.

20. A method of manufacturing a display device, comprising:
providing a display panel;
providing a protective panel which is attachable to the display panel; and
attaching the protective panel to the display panel to provide the display device, wherein the providing of the protective panel comprises:
provided a tray module comprising a tray and a plurality of protective modules which are accommodated in the tray, each of the plurality of protective modules comprising a release film removably attached to the protective panel;
separating one protective module among the plurality of protective modules accommodated in the tray, from the tray; and
removing the release film from the protective panel of the one protective module, for attachment of the protective panel to the display panel,
wherein the release film of each of the protective modules comprises:
a film layer comprising a first surface facing the protective panel and a second surface opposite to the first surface;
an embossed pattern layer protruding from the second surface; and
the embossed pattern layer defining a plurality of intaglio portions arranged along the film layer.

\* \* \* \* \*